United States Patent [19]
Finley

[11] Patent Number: 5,815,571
[45] Date of Patent: Sep. 29, 1998

[54] COMPUTER SYSTEM WITH SECURED DATA PATHS AND METHOD OF PROTECTION

[76] Inventor: Phillip Scott Finley, P.O. Box 40293, Eugene, Oreg. 97404

[21] Appl. No.: 734,840

[22] Filed: Oct. 28, 1996

[51] Int. Cl.$^6$ .................................................. G06F 12/14
[52] U.S. Cl. ............................ 380/4; 395/186; 380/2; 380/49
[58] Field of Search ................. 380/2, 4, 49; 395/186; 364/286.4

[56] References Cited

U.S. PATENT DOCUMENTS

| | | | |
|---|---|---|---|
| 4,278,837 | 7/1981 | Best | 380/4 |
| 4,432,064 | 2/1984 | Barker et al. | 364/550 |
| 4,438,494 | 3/1984 | Budde et al. | 395/181 |
| 4,442,484 | 4/1984 | Childs, Jr. et al. | 395/490 |
| 4,551,810 | 11/1985 | Levine | 364/474.24 |
| 4,558,413 | 12/1985 | Schmidt et al. | 395/619 |
| 4,573,119 | 2/1986 | Westheimer et al. | 380/4 |
| 4,584,639 | 4/1986 | Hardy | 395/186 |
| 4,591,975 | 5/1986 | Wade et al. | 364/200 |
| 4,907,228 | 3/1990 | Bruckert et al. | 395/182.09 |
| 4,916,704 | 4/1990 | Bruckert et al. | 395/182.09 |
| 4,937,861 | 6/1990 | Cummins | 380/2 |
| 5,005,174 | 4/1991 | Bruckert et al. | 395/182.09 |
| 5,063,596 | 11/1991 | Dyke | 380/49 |
| 5,065,312 | 11/1991 | Bruckert et al. | 395/182.09 |
| 5,068,780 | 11/1991 | Bruckert et al. | 395/652 |
| 5,099,485 | 3/1992 | Bruckert et al. | 395/182.09 |
| 5,153,881 | 10/1992 | Bruckert et al. | 395/182.08 |
| 5,163,138 | 11/1992 | Thirumalai | 395/311 |
| 5,185,877 | 2/1993 | Bissett et al. | 395/842 |
| 5,249,187 | 9/1993 | Bruckert et al. | 395/182.09 |
| 5,251,227 | 10/1993 | Bruckert et al. | 395/182.21 |
| 5,255,367 | 10/1993 | Bruckert et al. | 395/182.09 |
| 5,263,147 | 11/1993 | Francisco et al. | 380/4 X |
| 5,276,859 | 1/1994 | Reede | 395/559 |
| 5,289,540 | 2/1994 | Jones | 380/4 |
| 5,291,494 | 3/1994 | Bruckert et al. | 395/182.22 |
| 5,313,579 | 5/1994 | Chao | 395/200.64 |
| 5,325,430 | 6/1994 | Smyth et al. | 380/4 |
| 5,333,198 | 7/1994 | Houlberg et al. | 380/49 |
| 5,339,408 | 8/1994 | Bruckert et al. | 395/182.09 |
| 5,343,525 | 8/1994 | Hung et al. | 380/4 |
| 5,347,559 | 9/1994 | Hawkins et al. | 377/54 |
| 5,404,624 | 4/1995 | Tulpan | 380/4 |
| 5,416,842 | 5/1995 | Aziz | 380/30 |
| 5,455,863 | 10/1995 | Hoskinson | 380/21 |
| 5,479,514 | 12/1995 | Klonowski | 380/47 |
| 5,483,649 | 1/1996 | Kuznetsov et al. | 395/186 |
| 5,490,100 | 2/1996 | Kableshkov | 364/736 |
| 5,490,252 | 2/1996 | Macera et al. | 395/200.01 |
| 5,504,861 | 4/1996 | Crockett et al. | 395/182.11 |
| 5,506,961 | 4/1996 | Carlson et al. | 395/186 |
| 5,511,122 | 4/1996 | Atkinson | 380/25 |

*Primary Examiner*—Thomas H. Tarcza
*Assistant Examiner*—Pinchus M. Laufer
*Attorney, Agent, or Firm*—Palmatier, Sjoquist, Voigt & Christensen, P.A.

[57] ABSTRACT

A computer system with secured data paths consists of a main computer with a main processor, associated main memory, main input/output devices, and main data paths interconnecting the main processor, main memory, and main input/output devices; a security computer with a security processor, security memory, an operator console, and security data paths, connected to the main data paths of the main computer so as to intercept all data flowing along the main data paths; and a test computer with a test processor, test memory, test input/output devices, and test data paths, connected to the security computer. The main computer executes user programs, the security computer executes security programs, and the test computer test-executes user programs.

20 Claims, 3 Drawing Sheets

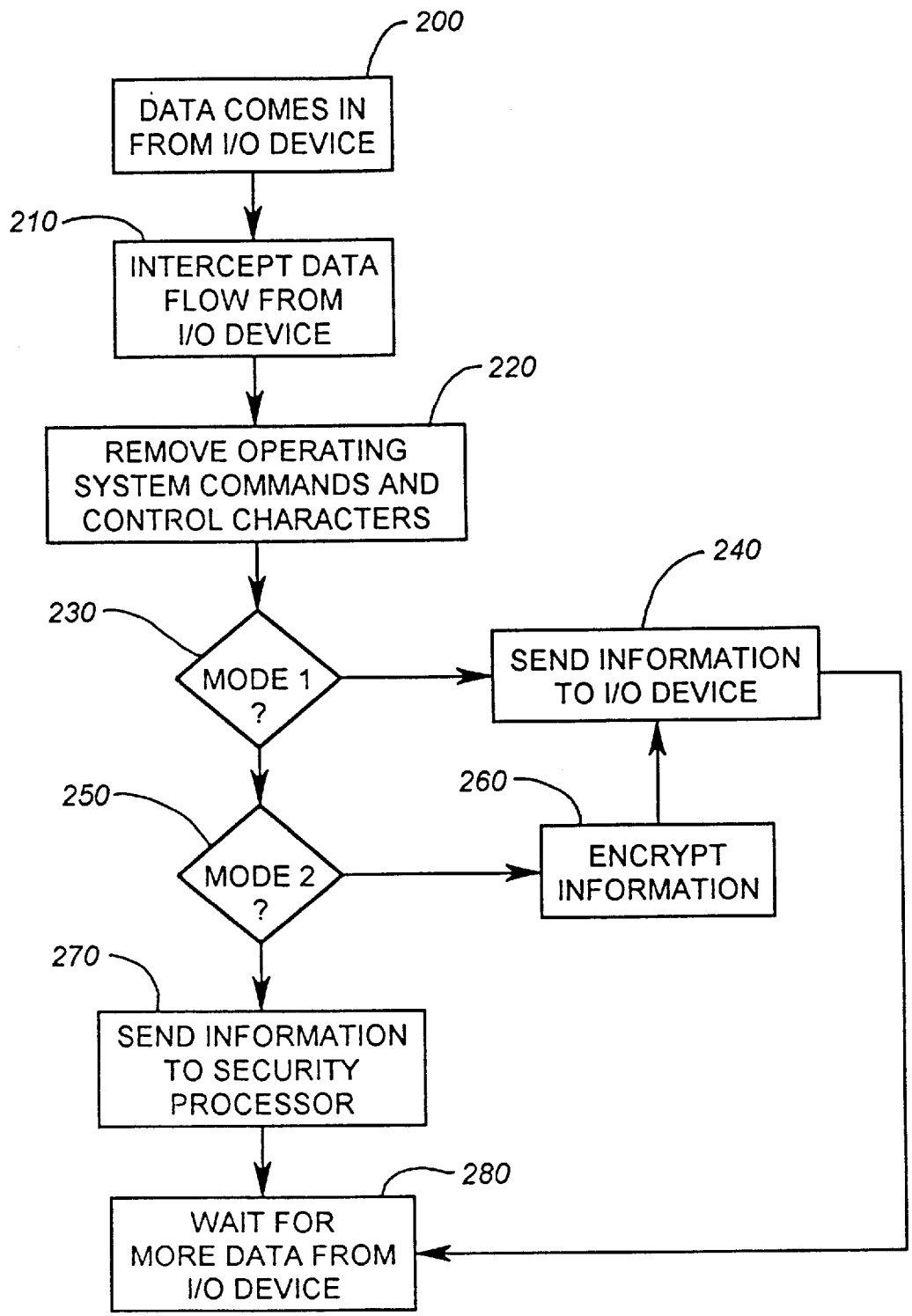

COMPUTER SYSTEM WITH SECURED DATA PATHS AND METHOD OF PROTECTION

BACKGROUND OF THE INVENTION

Any computer system which has external connections to input/output devices such as communications ports and modems is subject to attack by "hackers". Hackers are very inventive and it is very difficult to predict the manner in which a given system will be attacked. However, at least two primary modes of attack exist.

In the first mode of attack, a hacker gains access to a computer system, typically by dialing a telephone number connected to the computer system. The hacker first attempts to penetrate the system by determining a valid user identification and password. Once this is done, the hacker "logs on" to the system. Depending on the authorization level at which the hacker logs on, the hacker can do almost anything to the system, such as "crashing" the computer's operating system, corrupting data files, et cetera.

In the second mode of attack, a hacker plants a program known as a computer virus on a storage device in a computer to which the hacker has authorized access. If this computer is then accessed from another computer, over a network or by dial-up, the virus is sent from the hacker's computer to the target computer. The virus may then do anything to the target computer, such as crashing the operating system or totally wiping out data.

Past security systems have only addressed the first level of protection, i.e., preventing a hacker from gaining access to the system. However, once the hacker is able to gain access, there is typically no protection against the hacker doing anything to the system. In other words, once the hacker understands enough of the structure of the security system to penetrate it, the security system becomes moot.

There is a need for a computer system with secured data paths in which security is implemented by a separate security computer which cannot be penetrated by hackers. Even if a hacker knows in detail the structure of the security system, he cannot access it because the security processor is protected from processing operating system commands or control characters.

Additionally, the security computer protects the main computer by intercepting all information flowing between the main computer's input/output devices and main memory. If unauthorized commands are found, the security computer may take a number of actions such as sounding an alarm, breaking a dial-up connection, keeping a log of break-in attempts, or calling the police or FBI.

There is also a need for a computer system with a separate test computer on which downloaded applications may be executed in order to find viruses.

SUMMARY OF THE INVENTION

A computer system with secured data paths consists of a main computer with a main processor, associated main memory, main input/output devices, and main data paths interconnecting the main processor, main memory, and main input/output devices; a security computer with a security processor, security memory, an operator console, and security data paths, connected to the main data paths of the main computer so as to intercept all data flowing along the main data paths; and a test computer with a test processor, test memory, test input/output devices, and test data paths, connected to the security computer. The main computer executes user programs, the security computer executes security programs, and the test computer test-executes user programs.

A principal object and advantage of the present invention is that the main computer is totally unaware of security considerations. All security functions are implemented in the security computer in order to prevent a hacker from accessing the security functions.

A second principal object and advantage of the present invention is that the main computer may be constructed of standard components. The only change necessary to the main computer is to put a splice into each of the main data paths so that data flowing along the main data paths is intercepted by the security computer.

Another object and advantage of the present invention is that the security computer may prevent any operating system commands or control characters from reaching the main computer.

Another object and advantage of the present invention is that the security computer includes separate filter processors for each main computer data path, allowing high performance.

Another object and advantage of the present invention is that the filter processors may respond to requests from the main computer to change the way they act on main computer data. Upon request, the filter processors may be put into Filter Mode 1, in which the filter passes intercepted information unchanged to the original destination; Filter Mode 2, in which the filter processor encrypts the information before passing it on to the destination; and Filter Mode 3, in which the filter processor redirects the information to a security program executing in the security computer's security processor.

Still another object and advantage of the present invention is that it includes a separate test computer, connected through the security computer to the main computer. The test computer can receive user application programs destined for the main computer and test-execute such programs to detect any viruses, so that the main computer is never affected by such viruses.

Another object and advantage of the present invention is that the main computer, security computer, and test computer may all be printed circuit cards residing on one bus.

BRIEF DESCRIPTION OF THE DRAWINGS

FIG. 3 is a flowchart of the processing performed by the security computer on incoming information from one of the main computer's input/output devices.

DETAILED DESCRIPTION OF THE PREFERRED EMBODIMENTS

Figure 1:
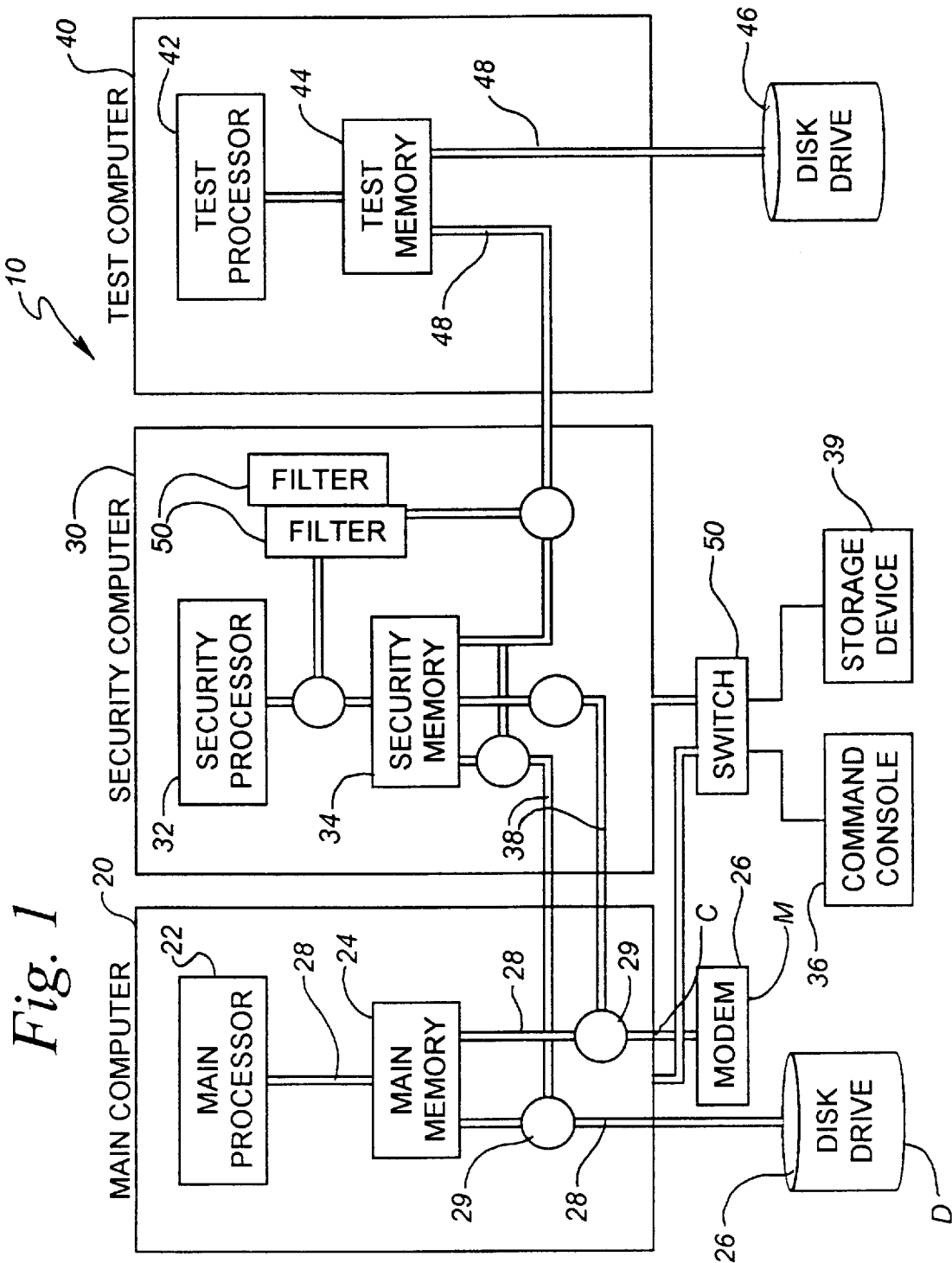
FIG. 1 is a schematic of the computer system of the present invention.

The computer system of the present invention is referenced in the Drawings as reference numeral 10.

The computer system 10 comprises a main computer 20, security computer 30,and test computer 40.

The function of the main computer 20 is to execute user programs in the same manner in which such programs would be executed on a standard computer. That is, the main computer 20 is preferably unaware of any security restrictions (other than perhaps validating an application-level user identification and password). All security functions are implemented in the security computer 30 in order to prevent a "hacker" from accessing the security functions, as will be further described below.

The main computer has typical standard components: a main processor 22 for executing program instructions, a main memory 24 for storing information and program instructions, a plurality of main input/output devices 26, such as disk drives, printers, and communications ports; and main data paths (buses) 28 interconnecting the main processor 22, main memory 24, and main input/output devices 26.

The essential difference between the main computer 20 of the present invention and a standard computer is that each of the main data paths (buses) 28 is "spliced" by splices 29 so that all information flowing along each data path between the main input/output devices 26 and main memory 24 is first intercepted by the security computer 30. In this manner, optionally, no operating system commands, control characters, or viruses can reach the main memory 24. Only safe information can reach the main memory 24 and be acted on by the main processor 22. In other words, the main processor 22 is isolated by a "firewall" (i.e., the security computer 30) from all external influences, with the exception of control by a local operator.

All security programming executes in the security processor 30. The security processor 30 preferably has no input/output connections other than a console interface, thereby preventing a "hacker" from gaining access to and altering the security programming.

The security computer 30 has as standard components a security processor 32, security memory 34 for storing information and security programs, an operator console 36, and security data paths (buses) 38. The splices 29 are connected to the security data paths (buses) 38 so that all information flowing along the main data paths (buses) 28 is intercepted by the security computer 30. The security computer may perform such functions as removing operating system commands and control characters from information flowing along the main data paths (buses) 28; encrypting information; analyzing the source of an attempted break-in; automatically shutting down a communications port on the main computer upon detecting unauthorized access attempts; notifying the police or FBI; or other security functions.

The one thing which the security computer 30 must not do is execute user programs. This is because any non-security software executing on the security computer 30 is subject to unauthorized access by "hackers", thereby potentially compromising the security system.

However, to provide complete protection against viruses, it is necessary to execute user programs. Many viruses do not appear until user programs are executed, because they are embedded in the user program. This is particularly the case for user programs which have been downloaded from bulletin boards or over the Internet. Clearly, user programs must be "test executed" in some location other than the main computer to detect embedded viruses.

Test execution of user programs is the function of the test computer 40. As user programs are loaded from disk drives or downloaded over communications lines, they are sent from the main computer 20 through the security computer 30 to the test computer 40 for test execution. The test computer 40 "fools" the programs into thinking they are being executed in the main computer 20. Therefore, any damage which would be done by an "exploding" virus will occur in the test computer 40, not in the main computer 20.

The user need not necessarily know that programs are being executed in the test computer 30 rather than in the main computer 20. Appropriate software in the main computer 20 may make the execution location of the programs transparent to the user. For example, software may be in place in the main computer 20 or security computer 30 which automatically loads Microsoft Windows into the test computer 40 and opens a window to a downloaded program executing on the test computer.

The test computer 40 has as standard components a test processor 42, test memory 44 for storing information and programs, optional test input/output devices 46, and test data paths (buses) 48. The test computer 40 is connected to the security computer 30.

The operator console 36 may be switchable by a switch 50 or other equivalent means between the main computer 20 and the security computer 30 for operator control of the main computer 20 and security computer 30. In this manner, one device may be used to control both computers, thus saving on hardware. The computer system 10 may also include a storage device 39 such as a CD-ROM switchable between the main computer 20 and the security computer 30 for loading programs into the main computer 20 and security computer 30.

The computer system 10 may preferably further comprise a plurality of filter processors 50 within the security computer 30. The purpose of the filter processors 50 is twofold. First, the filter processors 50 intercept all information flowing between the main computer 20 and the security processor 32 and may prevent any operating system commands or control characters from reaching the security processor 32. This provides an additional level of security beyond that provided by the security processor 30. That is, rather than allowing security programs in the security processor to be exposed to "hacker" break-in attempts, the filter processors 50 allow only non-destructive information to reach the security processor 30. This may be done, for example, by splitting control characters into two or more parts for transmission to the security processor.

The second function of the filter processors 50 is to improve the performance of the security computer 30. Rather than have information from all main data paths 28 examined and optionally changed by the security processor 32, the filter processors 50 can each selectively intercept information flowing along one of the main data paths 28. That is, one filter processor may exclusively intercept data flowing between a main disk drive D and main memory 34. Another filter processor may exclusively intercept data flowing between a communications port C and modem M and main memory 34. Each filter processor 50 may be separately programmed to perform different functions on the information from its main data path.

The functions which the filter processors 50 may perform on information flowing along a main data path 28 are preferably, but not limited to three. First, the filter processor may pass the information along unchanged to its destination in the main computer (Filter Mode 1),(see FIG. 3, 240). Second, the filter processor may encrypt the information before passing the information along (Filter Mode 2),(see FIG. 3, 260. Third, the filter processor 50 may pass the information into the security memory 34 where the information may be examined more intensively by a security program executing in the security processor 32 (see FIG. 3,270).

Preferably, user programs executing in the main computer 20 may make requests to the filter processors to change the mode of operation of the filter processors to one of the three modes discussed above. The filter processors 50 may be pre-configured to allow or ignore such requests, depending on the main data path 28 being filtered.

The filter processors 50 are also preferably connected to the test computer 40 to intercept all information flowing between the test computer 40 and the main computer 20. This prevents any viruses executing in the test computer 40 from affecting the main computer 20.

In particular, the filter processors 50 may transparently redirect input/output requests issued by the test processor 42 to its test input/output devices to one of the main computer's main input/output devices. In this manner, for example, a main computer mass storage device or disk drive may be partitioned so that it can be used simultaneously by the main computer 20 and the test computer 40. Preferably, the filter processors 50 encrypt any information sent to the main computer's disk drive from the test computer 40 so that such encrypted information is not readable by the main computer 20. This prevents any viruses in the test computer 40 from influencing the main computer 20.

Appropriate software executing in the main computer, security computer, and test computer controls the operation of the computer system 10. The following description describes one possible embodiment of such software and its use in one application and should not be regarded as limiting.

Figure 2:
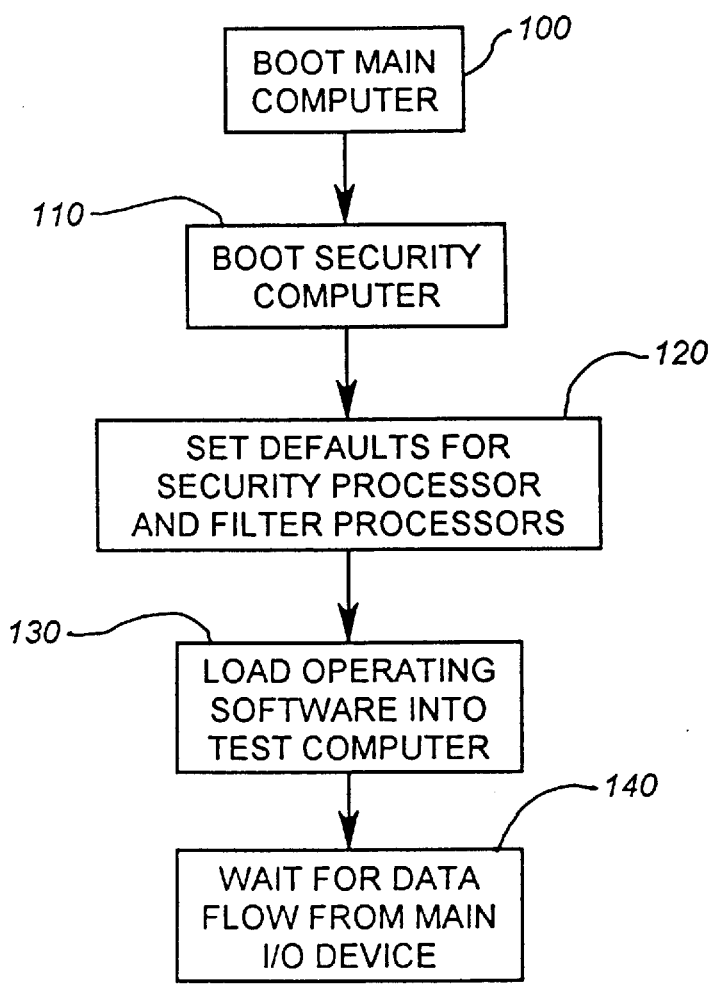
FIG. 2 is a flowchart of the steps needed to prepare the computer system for operation.

To prepare for operation of the computer system 10, the main computer 20 is first initialized or "booted" (FIG. 2, 100). This initialization can be started by the operator from the console 36 and causes operating software to be loaded into the main computer 20 from the storage device 39.

By a second operator command, or automatically by command from the main computer 20, the security computer 30 is booted (FIG. 2, 110) from the storage device 39 or other equivalent means such as non-volatile memory within the security computer 30.

Next, the default security settings for the security processor 32 and filter processors 50 is set by operator command from the console 39 (FIG. 2, 120).

Next, appropriate operating software is loaded into the test processor 40 (FIG. 2, 130). For example, user interface software on the main computer 20 may allow the user to boot the test processor and load and run a copy of Microsoft Windows from the main computer's disk drive D or from the test computer's disk drive. If the Microsoft Windows software is loaded into the test computer 40 from the main computer's disk drive D, the security processor 30 or the filter processor 50 must be pre-set to Filter Mode 1, that is, to allow the information to pass without change from the disk drive D to the test computer 40. Alternatively, the main processor 22 may initiate a request to the security processor 32 or filter processor 50 to set Filter Mode 1.

The filter processor preferably has a filter buffer (not shown) and ready-to-receive signal (not shown). Information flowing from the main computer to the filter processor passes into the filter buffer when the filter processor sets the ready-to-receive signal. When the filter processor 50 is in Filter Mode 1, the filter processor takes the information from the filter buffer and outputs it on the data path 48 to the security computer 40 and from there to the test computer's disk drive.

Alternatively, the main computer's disk drive D may be partitioned into a C: drive for use by the main computer 20 and a T: drive for use by the test computer 40. In such case, the filter processor 50 will be set, by the main computer 20, into Filter Mode 2. The filter processor will then encrypt the information by an appropriate encryption algorithm and return the information to the main data path 28 for transmission to the disk drive D.

In the next step, an appropriate telecommunications program such as Telix is loaded from the C: drive as described above into the test computer 40.

The user interface software may now load Microsoft Windows on the test computer 40. As Microsoft Windows is loaded from the T: drive, it is automatically decrypted by the filter processor 50, because the information was encrypted when it was copied from the C: drive. The interface software on the main computer 20 may now automatically start Microsoft Windows on the test computer 40 and generate a window for the Telix program.

The Telix telecommunications program is now used to download a user application over the communications port C and modem M of the main computer 20. As information comes in from the communications port C (FIG. 3, 200), it is intercepted (FIG. 3, 210) and sent to the filter processors where control characters and operating system commands are optionally removed (FIG. 3, 220). The filter processor may have been set to Mode 1 (FIG. 3, 230), Mode 2 (FIG. 3, 250), or Mode 3 (FIG. 3, 270). To implement maximum security during this download from outside the computer system 10, the main computer 20 generates a request to the filter processor 50 intercepting the data path 28 between the communications port C and main memory 24 to change to Filter Mode 3. In this mode, data is received by the filter buffer, read by the filter processor 50, and passed to the security processor 32 (FIG. 3, 270) (perhaps in partial character format) where a security program can process the data flow. This security program can do everything from pass the data along, to tripping a physical line disconnect to the communications port C, depending on what it finds in the data stream. The security program might also check the status hardware, main computer software, and types of data flow to detect break-in attempts. For example, the security program could detect multiple, very high speed logon attempts.

As the application program is downloaded, it may be written in encrypted form to the T: drive (remember that the filter processor 50 controlling the data path to the disk drive D is set in Filter Mode 2 for encryption). Therefore, the main computer can not read or be affected by the downloaded application program.

Before encrypting the program, the security computer 30 may execute an anti-virus program to scan for and detect any viruses present in the downloaded application.

If the application program was downloaded in compressed format (by "zipping" software), the application must be de-compressed ("unzipped") before use. This is usually done by user command. However, the de-compressed program will be uncompressed to the T: drive in encrypted format so that any hacker code will affect only the T: drive and the test processor 40, not the main computer 20. After de-compression, the decompressed program may again be scanned for viruses.

In the next step, the user application is executed in the test processor 40. Any "Trojan Horse" program embedded in the user application can affect only the test processor 40 and the T: drive, not the main computer 20. Any input/output requests which the application makes will be intercepted by the filter processor 50 and security processor 32. Depending on the request, the security program may take further action.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed:

1. A computer system with secured data paths, comprising:
   (a) a main computer with a main processor, associated main memory, main input/output devices, and main internal data paths interconnecting the main processor, main memory, and main input/output devices;
   (b) a security computer, distinct from the main computer and executing security programming distinct from the programming of the main computer, with a security processor, security memory, an operator console, and security data paths, the security computer being connected to the main internal data paths of the main computer so as to intercept all data flowing along the main data paths; and
   (c) a test computer, distinct from the security computer with a test processor, test memory, test input/output devices, and test data paths, the test computer being connected to the security computer wherein the main processor executes user programs, the security processor executes security programs, and the test processor test-executes copies of user programs, the security computer examining all information flowing on the main internal data paths.

2. The computer system of claim 1, further comprising a console switchable between the main computer and the security computer for operator control of the main computer and the security computer.

3. The computer system of claim 2, further comprising a storage device switchable between the main computer and the security computer for loading programs into the main computer and security computer.

4. The computer system of claim 1, further comprising a plurality of filter processors within the security computer, the filter processors connected to the main computer and the security processor so as to intercept all information flowing between the main computer and the security processor.

5. The computer system of claim 4, wherein each of the filter processors is connected to one of the main data paths and can selectively intercept information flowing along one of the main data paths of the main computer.

6. The computer system of claim 5, wherein the filter processors take one of three actions on information flowing between the main computer and the security processor:
   (a) pass the information along unchanged to its destination in the main computer;
   (b) encrypt the information before passing it to its destination; and
   (c) pass the information to a security program executing in the security processor.

7. The computer system of claim 6, wherein programs executing in the main computer can make requests to the filter processors to change the mode of operation of the filter processors.

8. The computer system of claim 4, wherein the filter processors are also connected to the test computer and intercept all information flowing between the test computer and the main computer.

9. The computer system of claim 8, wherein the filter processors can transparently redirect input/output requests issued by the test processor to its test input/output devices to one of the main computer's main input/output devices.

10. The computer system of claim 9, wherein the filter processors encrypt information flowing between the test computer and the main computer's input/output devices so that the information is unreadable by the main computer.

11. The computer system of claim 1, wherein the security computer is isolated from all external inputs other than connections to the main data paths, connection to the test computer, and the operator console.

12. A method of protecting a main computer with internal data paths between the main computer's input/output devices and main memory against unauthorized use and unauthorized change, comprising:
    (a) connecting a security computer distinct from the main computer and executing security programming distinct from the programming of the main computer and having a security processor directly to the main computer's internal data paths;
    (b) intercepting all information flowing between the main computer's main memory and an input/output device over the internal data paths;
    (c) transmitting the intercepted information to the security computer;
    (d) relaying the intercepted information to a destination based on the information content and the internal data path intercepted; and
    (e) transmitting selected user application programs through the security computer for execution in a test computer.

13. The method of claim 12, wherein the destination is the main computer's input/output device.

14. The method of claim 12, wherein the destination is the main computer's input/output device and the security computer encrypts the information.

15. The method of claim 12, wherein the destination is a security program executing in the security processor.

16. The method of claim 12, wherein the intercepted information is processed by a filter processor separate from the security processor.

17. The method of claim 16, wherein the destination selected by the filter processor is determined by a request from the main computer.

18. The method of claim 16, further comprising the step of removing any operating system commands or control characters by the filter processor.

19. The method of claim 12, wherein the test computer and the main computer share a mass storage device, the security computer encrypting any information written to the mass storage device so that such information is not readable by the main computer.

20. A method of protecting a main computer with internal data paths between the main computer's input/output devices and main memory against unauthorized use and unauthorized change, comprising:
    (a) connecting a security computer having a security processor directly to the main computer's internal data paths;
    (b) intercepting all information flowing between the main computer's main memory and an input/output device over the internal data paths;
    (c) transmitting the intercepted information to the security computer; and
    (d) relaying the intercepted information to a destination based on the information content and the internal data path intercepted,
        wherein the intercepted information is processed by a filter processor separate from the security processor.

* * * * *